United States Patent [19]
Bailey et al.

[11] 4,048,348
[45] * Sept. 13, 1977

[54] METHOD OF APPLYING A FUSED SILICA COATING TO A SUBSTRATE

[75] Inventors: Cecil Bailey, Woodlyn; Walter C. Balchunas, Linfield, both of Pa.; John E. Zlupko, Delran, N.J.

[73] Assignee: General Electric Company, Philadelphia, Pa.

[*] Notice: The portion of the term of this patent subsequent to June 4, 1991, has been disclaimed.

[21] Appl. No.: 413,489

[22] Filed: Nov. 7, 1973

Related U.S. Application Data

[63] Continuation of Ser. No. 190,190, Oct. 18, 1971, Pat. No. 3,814,620.

[51] Int. Cl.² .............................................. B05D 3/06
[52] U.S. Cl. .................................. 427/34; 200/144 C; 219/121 P
[58] Field of Search ........... 117/93.1 PF, 23, 126 AF, 117/47 H; 200/144 C; 219/121 P

[56] References Cited

U.S. PATENT DOCUMENTS

| | | | |
|---|---|---|---|
| 3,009,041 | 11/1961 | Zlupko | 117/105.2 |
| 3,649,406 | 3/1972 | McNish | 117/126 AF |

FOREIGN PATENT DOCUMENTS

| | | | |
|---|---|---|---|
| 345,653 | 2/1920 | Germany | 117/105.2 |
| 343,664 | 11/1921 | Germany | 117/105.2 |

Primary Examiner—John H. Newsome
Attorney, Agent, or Firm—William Freedman

[57] ABSTRACT

Discloses a method of applying an amorphous fused silica coating to a substrate of refractory non-metallic material. High temperature arc plasma from an arc plasma spray gun is projected onto the substrate surface; and particles of a material consisting essentially of crystalline silica are fed into the plasma, where they are melted and entrained in the plasma. The gun is held close enough to the substrate to effect melting of the surface of the substrate, or the previously-applied material, in the region where the molten drops of silica entrained in the plasma are impinging against said surface.

2 Claims, 2 Drawing Figures

METHOD OF APPLYING A FUSED SILICA COATING TO A SUBSTRATE

This is a continuation of application Ser. No. 190,190, filed Oct. 18, 1971 now U.S. Pat. No. 3,814,620.

BACKGROUND

This invention relates to a method of applying a fused silica coating to a substrate of refractory non-metallic material and, more particularly, relates to a method of applying such a coating by arc plasma spraying.

For certain high temperature applications, e.g., an arc chute for an electric circuit breaker, fused silica is a nearly ideal material due to its exceptionally high resistance to thermal shock, its good electrical insulating properties, even when hot, and its ability to withstand exposure to a high current arc with little erosion and with little evolution of gases. Efforts have been made to apply the fused silica coating to a substrate by an arc plasma spraying process, but those prior efforts of which we are aware have not been very successful because the particles impinging against the substrate either have not formed a coating or have not adhered sufficiently firmly to the substrate. In addition, these efforts have encountered spraying difficulties, such as the formation of fibers instead of molten droplets, which fibers have clogged the plasma spray gun.

SUMMARY

An object of our invention is to provide an arc plasma spraying process for applying to a substrate of non-metallic material a fused silica coating which tenaciously adheres to the substrate.

In carrying out our invention in one form, we provide an arc plasma spray gun in which we develop a high temperature arc plasma that is projected onto a surface of refractory non-metallic material. We feed into this arc plasma particles of a material consisting essentially of crystalline silica, which particles are melted by the high temperature arc plasma and entrained in said arc plasma. The gun is held close enough to the substrate during the time arc plasma is being projected thereon to effect melting of the surface of the substrate or the previously-applied material in the region where said molten particles of silica are impinging against said surface.

BRIEF DESCRIPTION OF DRAWING

For a better understanding of the invention, reference may be had to the following description taken in conjunction with the accompanying drawing, wherein.

DETAILED DESCRIPTION OF PREFERRED EMBODIMENTS

Figure 1:
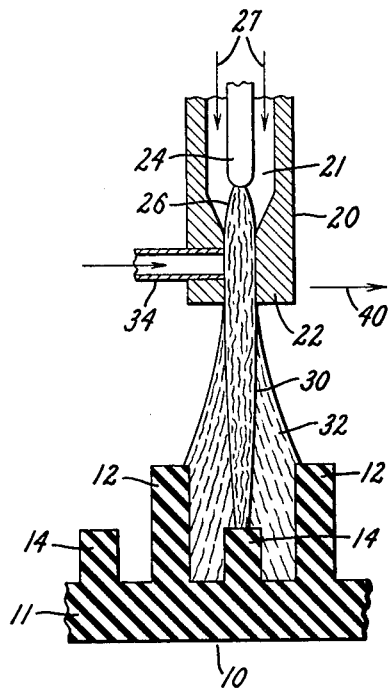
FIG. 1 is a diagrammatic view of the arc plasma spraying process being applied to a portion of an arc chute of an electric circuit breaker. The arc chute portion is shown in section.
Figure 2:
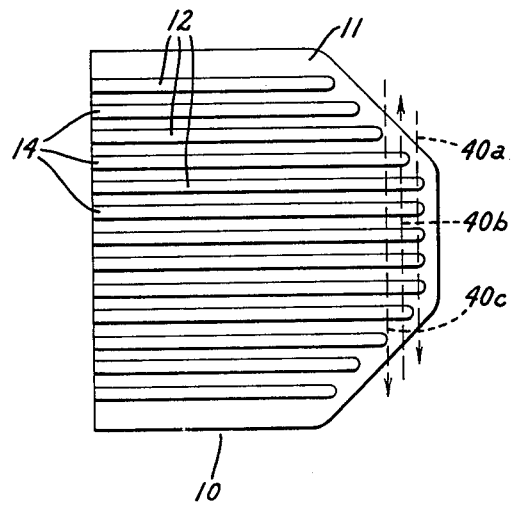
FIG. 2 is a plan view showing the arc chute and the pattern followed by the arc plasma spray gun during a spraying operation. de

Referring now to FIG. 1, there is shown a base 10 of refractory non-metallic material to which it is desired to apply a coating of amorphous fused silica. In the illustrated example, the base 10 is a portion of an arc chute for a high power electric circuit breaker, such as shown, for example, in application Ser. No. 162,431-Frind et al, filed July 14, 1971, and assigned to the asignee of the present invention. The base 10 comprises a body 11 and relatively long fins 12 projecting therefrom in spaced apart relationship. Between these long fins are relatively short fins 14. The fins 12 and 14 are elongated elements extending generally parallel to each other, as can be seen in FIG. 2.

In one embodiment of the invention, this arc chute portion 10 is formed of a refractory material made by reacting concentrated orthophosphoric acid and chrysotile asbestos, as is disclosed, for example, in U.S. Pat. No. 2,366,485-Brink et al and 2,704,381-Nelson. Further by way of example and not limitation, a preferred composition of such material also includes a zircon filler in an amount of about 60 percent by weight of the composition. This composition is capable of being hot molded and subsequently machined into intricate forms of good mechanical strength.

We apply the fused silica coating by relying upon an arc plasma spray gun of a conventional form. This spray gun comprises a tubular housing 20 which includes an arcing chamber 21 and an exhaust nozzle 22 leading from the arcing chamber to the exterior. Within the arcing chamber, there is an arcing electrode 24, which serves as a cathode, that is suitably electrically insulated from housing 20, which serves as an anode. An electric arc 26 carrying direct current is formed between the cathodic electrode 24 and the anodic housing 20, and a suitable gas such as nitrogen is fed into the arcing region, as indicated by the arrows 27. This gas is converted into a hot arc plasma, by the high temperature of the arc, and this plasma is discharged from the gun via the exhaust nozzle 22. The discharge from the nozzle may be thought of as comprising a plasma frame 30 and a spray stream 32.

The housing 20 contains a feed passage 34 which exhausts into the nozzle flow passage. Through this feed passage 34, spray powder suspended in a suitable carrier gas, e.g., nitrogen or argon, is fed into the plasma flame. Upon entering the plasma flame, the particles that constitute the powder are melted by the high temperature of the plasma flame, and these molten particles are entrained in the plasma stream.

The plasma stream containing these molten particles is projected from nozzle 22 onto the upper surface of the base 10. Upon striking the base or previously-applied spray material, the particles flatten and soon freeze, thus forming the desired coating.

As pointed out hereinabove, it is desired to apply an amorphous fused silica coating to the base 10. Prior efforts to apply a fused silica coating by arc plasma spraying have not been very successful either because the particles impinging against the substrate have not formed a coating or have not adhered sufficiently firmly to the substrate or because of spraying difficulties, such as clogging of the gun and fiber-formation, have been encountered. Many of these prior efforts have relied upon powdered fused silica as the source material which is fed into the plasma stream, and this we have found is one of the main sources of the above problems. Instead of fused silica, we use crystalline silica as our source material. This crystalline silica, in the form of quartz sand, is suspended in a suitable gaseous carrier, such as nitrogen or argon, and fed in this suspended condition through the feed passage 34 into the plasma stream. The high temperature of the plasma stream melts the particles of crystalline silica and converts them into molten droplets of fused silica that are entrained in the plasma stream. The coating that results from freezing of these particles upon their impacting against the base 10 is essentially pure fused silica, containing essentially no crystalline silica. Microscopic examinations of the coating have shown no more than a few percent of crystalline silica in the coating.

In order to form a strong bond between the fused silica and the substrate, it is important that the substrate be heated by the hot plasma flame to a temperature that melts its surface in the region where the molten particles of fused silica are impacting against it. Unless this localized melting occurs, the bond between the coating and substrate is poor. The surface melting reduces the sharpness of the interface between the coating and the substrate and provides for more of a fusion of the two materials in this region. The hot plasma flame is believed to maintain the previously-applied silica in a molten state during the time that additional molten silica particles are impinging thereagainst, thereby fusing together all of the superimposed silica particles in an amorphous structure of fused silica.

For effecting this melting of the surface of the substrate, we hold the nozzle 22 of gun 20 so close to the surface of the substrate that the substrate surface is located either within the plasma flame 30 or closely adjacent the end of the plasma flame 30. In one form of the invention, this distance between the nozzle and the substrate is one to two inches.

A fused silica coating applied in the above described manner has excellent thermal shock resistance. As an indication of this, we have tested sample specimens (2 inches by 4 inches) coated in this manner by repeatedly passing across their fused-silica coated surface an oxyacetylene flame until the surface has reached red heat, after which the specimen has been plunged into a bath of water at room temperature. Despite this harsh treatment, the coating has remained undamaged and has retained its tenacious bond to the substrate. An another indication of the excellent thermal shock resistance of the fused silica coating, arc chutes coated in this manner have been exposed to high current arcs tens of thousands of amperes in magnitude with little or no spalling or break-off of the coating. Specific examples of such arc chutes are disclosed and claimed in the aforesaid Frind et al application Ser. No. 162,431.

In applying the coating to the finned base 10 of FIG. 1, we move the arc plasma gun perpendicular to the longitudinal dimensions of the fins 12, 14, as indicated by the arrow 40 in FIG. 1. The plan view of FIG. 2 illustrates by dotted lines 40a, 40b, and 40c the parallel paths followed by the gun during three successive passes, each pass being perpendicular to the length of the fins 12 and 14. The path of the first pass is represented by dotted line 40a; that of the second by 40b; and that of the third by 40c. Each pass of the gun follows a path parallel to and closely adjacent the preceding pass, so that the coating resulting from each pass overlaps slightly that resulting from the preceding pass. This perpendicular movement reduces the amount of energy that is supplied to any one fin during a given pass of the gun, as compared to the energy that would be supplied if the gun was moved longitudinally of the fin being coated during each pass. This reduced energy appreciably reduces the tendency of the fin to warp and crack under the heatinduced stresses. The gun is moved a short distance to the left on each successive pass until the entire area which it is desired to coat is sprayed.

In one embodiment of the invention, where the base is of phospho-asbestos material, we utilize the plasma spraying operation both to flame treat the base material and to apply the desired coating. In this embodiment, the heat of the plasma flame during the spraying process is relied upon to partially degas and to partially remove absorbed and chemically-bound water from the substrate in the region adjacent to its exposed surface.

In another embodiment of the invention, we achieve the desired flame treating by first flame treating the substrate with the arc plasma discharge without spraying and then arc plasma spraying the substrate following completion of the flame treatment. In this second embodiment of the invention, it is not necessary to limit the speed of movement of the gun during spraying by any requirement for degassing or moisture removal; but it is necessary that movement of the gun be sufficiently slow to allow surface melting during arc plasma spraying. In this second embodiment, as applied to the finned arc chute, both the flame treatment and the spraying operations are performed by passing the gun along parallel paths perpendicular to the length of the fins, thereby greatly reducing the tendency of the fins to warp and crack, as previously explained. While flame treatment of the fins has heretofore been performed by moving a plasma gun along such perpendicular paths, this was not a spraying operation and we are not aware of any thermal spraying operation that has been performed by using such perpendicular paths.

Although we have described our process particularly in connection with the coating of a substrate made of a zircon filled phosphoasbestos material, it is to be understood that this has been done by way of example and not limitation. Our process can also be used in coating many other refractory non-metallic materials, e.g., phosphoasbestos material without the zircon filler, Portland cement-asbestos such as disclosed in U.S. Pat. 2,270,723-Boehne, and glass-bonded mica.

It is also to be understood that, in its broader aspects, our invention is not limited to use with a base having fins. In this respect, we can use our process for applying a fused silica coating to a flat or a curved surface containing no fins or the like.

While we have shown and described particular embodiments of our invention, it will be obvious to those skilled in the art that various changes and modifications may be made without departing from our invention in its broader aspects; and we, therefore intend herein to cover all such changes and modifications as fall within the true spirit and scope of our invention.

What we claim as new and desire to secure by Letters Patent of the United States is:

1. A method of applying to a substrate of refractory non-metallic material a coating consisting essentially of fused silica that is firmly bonded to said substrate, said substrate comprising a base with elongated fins projecting therefrom, the method comprising the steps of:

a. providing an arc plasma spray gun that comprises an arc chamber in which an electric arc is established, means for feeding gas into the arcing chamber to develop a high temperature arc plasma, a nozzle through which said arc plasma is exhausted from said gun, and means through which particles of coating material can be fed into said arc plasma to melt the particles and entrain them in the arc plasma exhausted from said gun, b. developing high-temperature arc plasma within said gun and projecting said arc plasma from the gun onto a surface of said refractory non-metallic substrate material, c. feeding into said arc plasma a powder consisting essentially of particles of a material consisting essentially of crystalline silica, which particles are substantially completely melted by said high-temperature arc plasma and entrained in said arc plasma as droplets of molten fused silica that impinge against the surface of said substrate when said arc plasma is projected thereon, d. holding said nozzle close enough to said substrate during the times that arc plasma containing said molten fused silica droplets is being projected thereon to effect melting of the substrate surface that said molten silica droplets are impinging against, and e. moving said arc plasma spray gun generally perpendicular to the length of said fins during the arc plasma spraying step of (c) and (d).

2. The method of claim 1 in which said arc plasma spray gun is moved across the surface of said substrate in successive passes following generally parallel paths that are sufficiently close together that the spray coating from one pass overlaps with that from the immediately preceding pass.

* * * * *